United States Patent
Sato et al.

(10) Patent No.: US 7,384,070 B2
(45) Date of Patent: Jun. 10, 2008

(54) SHOCK ABSORBING STEERING COLUMN DEVICE FOR VEHICLE

(75) Inventors: Kenji Sato, Gunma-ken (JP); Naoki Sawada, Gunma-ken (JP)

(73) Assignee: NSK, Ltd., Tokyo (JP)

( * ) Notice: Subject to any disclaimer, the term of this patent is extended or adjusted under 35 U.S.C. 154(b) by 333 days.

(21) Appl. No.: 10/501,715

(22) PCT Filed: Jun. 30, 2003

(86) PCT No.: PCT/JP03/08268

§ 371 (c)(1),
(2), (4) Date: Jul. 19, 2004

(87) PCT Pub. No.: WO2004/005109

PCT Pub. Date: Jan. 15, 2004

(65) Prior Publication Data

US 2005/0093284 A1 May 5, 2005

(30) Foreign Application Priority Data

Jul. 2, 2002 (JP) .............. 2002-193628

(51) Int. Cl.
B62D 1/11 (2006.01)
(52) U.S. Cl. .............. 280/777; 280/775; 280/779
(58) Field of Classification Search .............. 280/777, 280/779, 775; 74/492, 493
See application file for complete search history.

(56) References Cited

U.S. PATENT DOCUMENTS

| 4,228,695 | A | * | 10/1980 | Trevisson et al. ............. 74/492 |
| 4,627,306 | A | * | 12/1986 | Berenjian ..................... 74/492 |
| 4,648,624 | A | * | 3/1987 | Mouhot et al. ............. 280/775 |
| 4,703,669 | A | * | 11/1987 | Hyodo ........................ 74/492 |
| 4,733,575 | A | * | 3/1988 | Nakamura .................... 74/493 |
| 4,901,592 | A | * | 2/1990 | Ito et al. ....................... 74/492 |
| 4,998,999 | A | * | 3/1991 | Yuzuriha et al. ............. 280/777 |
| 5,230,533 | A | * | 7/1993 | Yamaguchi ................. 280/775 |
| 5,294,149 | A | * | 3/1994 | Haldric et al. .............. 280/775 |

(Continued)

FOREIGN PATENT DOCUMENTS

DE 696 00 661 2/1999

(Continued)

OTHER PUBLICATIONS

Chinese Patent Application 038045176, English Translation of Second Office Action dated Mar. 9, 2007.

Primary Examiner—Lesley D. Morris
Assistant Examiner—Karen Jane J. Amores
(74) Attorney, Agent, or Firm—Miles & Stockbridge P.C.

(57) ABSTRACT

An impact absorption type steering column apparatus for an automotive vehicle is constructed so that a car body sided bracket secured to a car body is press-fitted to a column sided bracket provided separately from or integrally with a steering column, the steering column is supported by inserting a bolt through through-holes formed in the two brackets, and, when a secondary collision happens, an impact energy thereof is absorbed in a way that causes a flexural deformation of the car body sided bracket while moving the steering column towards the front of the automotive vehicle. In this apparatus, the through-hole of the column sided bracket is formed as an elongate hole extending to the rear side of the automotive vehicle from a position of the bolt.

8 Claims, 9 Drawing Sheets

U.S. PATENT DOCUMENTS

| | | | |
|---|---|---|---|
| 5,555,772 A * | 9/1996 | Schneider | 74/493 |
| 5,593,183 A * | 1/1997 | Fouquet et al. | 280/775 |
| 5,605,352 A * | 2/1997 | Riefe et al. | 280/777 |
| 5,645,299 A * | 7/1997 | Dies et al. | 280/779 |
| 5,700,032 A * | 12/1997 | Fukunaga | 280/775 |
| 5,788,278 A * | 8/1998 | Thomas et al. | 280/777 |
| 5,845,936 A * | 12/1998 | Higashino | 280/775 |
| 5,857,703 A * | 1/1999 | Kinoshita et al. | 280/775 |
| 5,875,686 A * | 3/1999 | Kinoshita et al. | 74/492 |
| 5,944,348 A * | 8/1999 | Boyle et al. | 280/777 |
| 6,148,687 A * | 11/2000 | Kurita | 74/492 |
| 6,234,528 B1 | 5/2001 | Ben-Rhouma et al. | 280/777 |
| 6,324,935 B1 * | 12/2001 | Schoen et al. | 74/492 |
| 6,343,523 B1 | 2/2002 | Castellon | 74/493 |
| 6,345,842 B1 * | 2/2002 | Igarashi et al. | 280/775 |
| 6,367,840 B1 * | 4/2002 | Duval et al. | 280/777 |
| 6,378,903 B1 * | 4/2002 | Yabutsuka et al. | 280/777 |
| 6,394,493 B1 * | 5/2002 | Kieserling et al. | 280/775 |
| 6,443,491 B1 * | 9/2002 | Fukunaga | 280/779 |
| 6,523,432 B1 * | 2/2003 | Yamamoto et al. | 74/492 |
| 6,799,779 B2 * | 10/2004 | Shibayama | 280/777 |
| 7,125,046 B2 * | 10/2006 | Sawada et al. | 280/777 |
| 7,125,047 B2 * | 10/2006 | Lee | 280/777 |
| 7,134,692 B2 * | 11/2006 | Yamamura | 280/777 |
| 7,178,833 B2 * | 2/2007 | Cymbal et al. | 280/777 |
| 7,311,333 B2 * | 12/2007 | Sato et al. | 280/777 |
| 2002/0026848 A1 * | 3/2002 | Kurita | 74/493 |
| 2004/0094945 A1 * | 5/2004 | Sawada et al. | 280/777 |
| 2004/0231450 A1 * | 11/2004 | Yamamura | 74/492 |
| 2005/0093284 A1 * | 5/2005 | Sato et al. | 280/777 |
| 2005/0167962 A1 * | 8/2005 | Sato et al. | 280/775 |
| 2005/0173912 A1 * | 8/2005 | Nakano et al. | 280/777 |
| 2005/0173913 A1 * | 8/2005 | Ishida et al. | 280/777 |
| 2005/0268739 A1 * | 12/2005 | Sato et al. | 74/492 |

FOREIGN PATENT DOCUMENTS

| | | |
|---|---|---|
| EP | 0 928 733 | 12/1998 |
| EP | 0 928 733 A | 7/1999 |
| GB | 2 365 826 | 8/2000 |
| GB | 2 365 826 A | 2/2002 |
| JP | UM 62-23771 | 2/1987 |
| JP | 11-189164 | 7/1999 |
| JP | 2978788 | 9/1999 |
| JP | 2000-229577 | 8/2000 |
| JP | 2001-106092 | 4/2001 |
| JP | 2002-59853 | 2/2002 |

* cited by examiner

SHOCK ABSORBING STEERING COLUMN DEVICE FOR VEHICLE

TECHNICAL FIELD

The present invention relates to an impact absorption type steering column apparatus for an automotive vehicle.

BACKGROUND ARTS

In case an automotive vehicle falls into a collision, there is a possibility in which a driver might suffer a secondary collision with a steering wheel due to an inertia. Protection of the driver on this occasion involves adopting an impact absorption type steering column apparatus. A steering column, just when the driver secondarily collides with the steering wheel, separates together with a steering shaft from a car body, and an energy absorption member gets collapsed, thereby absorbing an impact energy thereof while moving forwards of the automotive vehicle.

An apparatus will be exemplified by way of one example of the impact absorption type steering column apparatus, wherein, as Japanese Patent No. 2978788 and Japanese Patent Application Laid-Open Publication No. 2000-229577, disclose impact energy absorption systems, upon the secondary collision, its impact energy is absorbed by causing a flexural deformation of a car body sided bracket (a tilt bracket and a lower bracket) through which the steering column is secured to a car body.

By the way, in the case of Japanese Patent No. 2978788 given above, upon the secondary collision, the impact energy thereof causes the tilt bracket to make its flexural deformation towards of the automotive vehicle, a tilt position fastening bolt displaces along a groove for a tilt adjustment and reaches a lowermost position of this tilt adjustment groove, at which time a collapse stroke of the steering column comes to an end.

Further, in the case of Japanese Patent Application Laid-Open Publication No. 2000-229577 as well, upon the secondary collision, when the lower bracket makes a predetermined quantity of its flexural deformation forwards of the automotive vehicle, the collapse stroke of the steering column terminates, and the steering column stops.

Thus, it is normal that the quantity of the collapse stroke of the steering column is generally specified to a predetermined quantity corresponding to a configuration of the bracket, dimensions of the tilt adjustment groove, and so forth.

Depending on a type of the automotive vehicle and a delivery destination thereof, however, there is a demand for a further increase in the quantity of the collapse stroke of the steering column.

DISCLOSURE OF THE INVENTION

It is an object of the present invention, which was devised under the circumstances described above, to provide an impact absorption type steering column apparatus for an automotive vehicle that is capable of further increasing a collapse stroke of a steering column when required.

To accomplish the above object, there is provided an impact absorption type steering column apparatus for an automotive vehicle in which a column sided bracket provided separately from or integrally with a steering column is press-fitted to a car body sided bracket secured to a car body, the steering column is supported by inserting a bolt through through-holes formed in the two brackets, and, when a secondary collision happens, an impact energy thereof is absorbed in a way that causes a flexural deformation of the car body sided bracket while moving the steering column towards the front of the automotive vehicle, wherein the through-holes of the column sided bracket are formed as elongate holes extending to the rear side of the automotive vehicle, from a position of the bolt. Thus, according to the present invention, when the secondary collision happens, its impact energy is absorbed in a way that causes the flexural deformation of the car body sided bracket while moving the steering column towards the front of the automotive vehicle, and, on this occasion, the through-hole of the column sided bracket being formed as the elongate hole extending towards the rear side of the automotive vehicle from a bolt position, even after an end of the collapse stroke of the steering column due to the flexural deformation of the body sided bracket, the column sided bracket moves, with respect to the bolt of the car body sided bracket, together with the steering column along this elongate hole towards the front of the automotive vehicle while engaging therewith within a range of the front side end through the rear side end, and thus make the collapse stroke.

Namely, it is possible to ensure a collapse stroke quantity throughout the elongate hole of the column sided bracket in addition to a collapse stroke quantity due to the flexural deformation of the body sided bracket. Accordingly, as required depending on a type of the automotive vehicle, its delivery destination and so forth, the collapse stroke quantity in the steering column can be further augmented.

Note that the collapse stroke of the steering column throughout the elongate hole of the column sided bracket might occur earlier than the collapse stroke of the steering column due to the flexural deformation of the car body sided bracket.

EMBODIMENTS OF THE INVENTION

An impact absorption type steering column apparatus for an automotive vehicle in embodiments of the present invention will be described with reference to the drawings.

First Embodiment

Figure 1A:
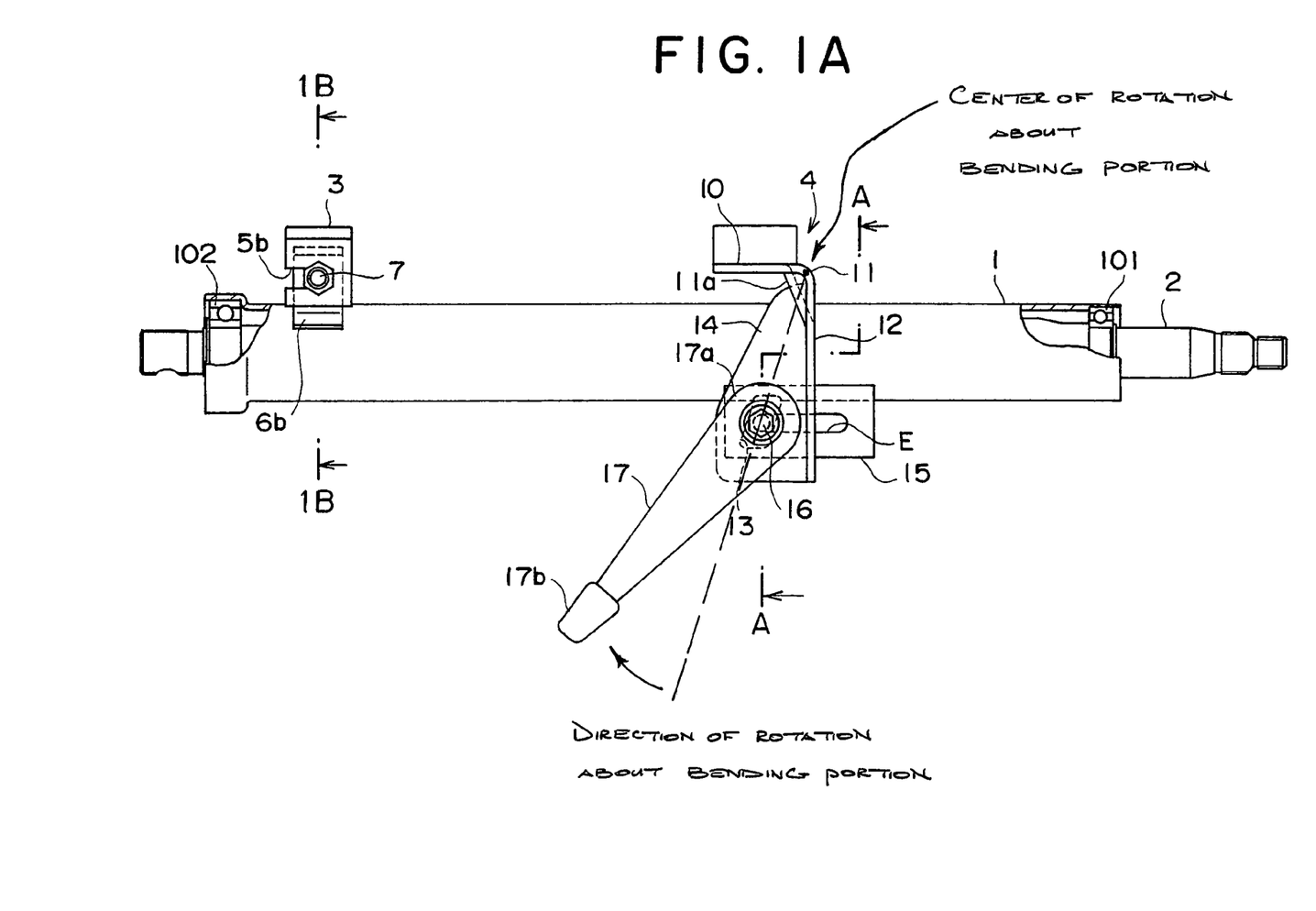
FIG. 1A is a side view of an impact absorption type steering column apparatus for an automotive vehicle in a first embodiment of the present invention.
Figure 1B:
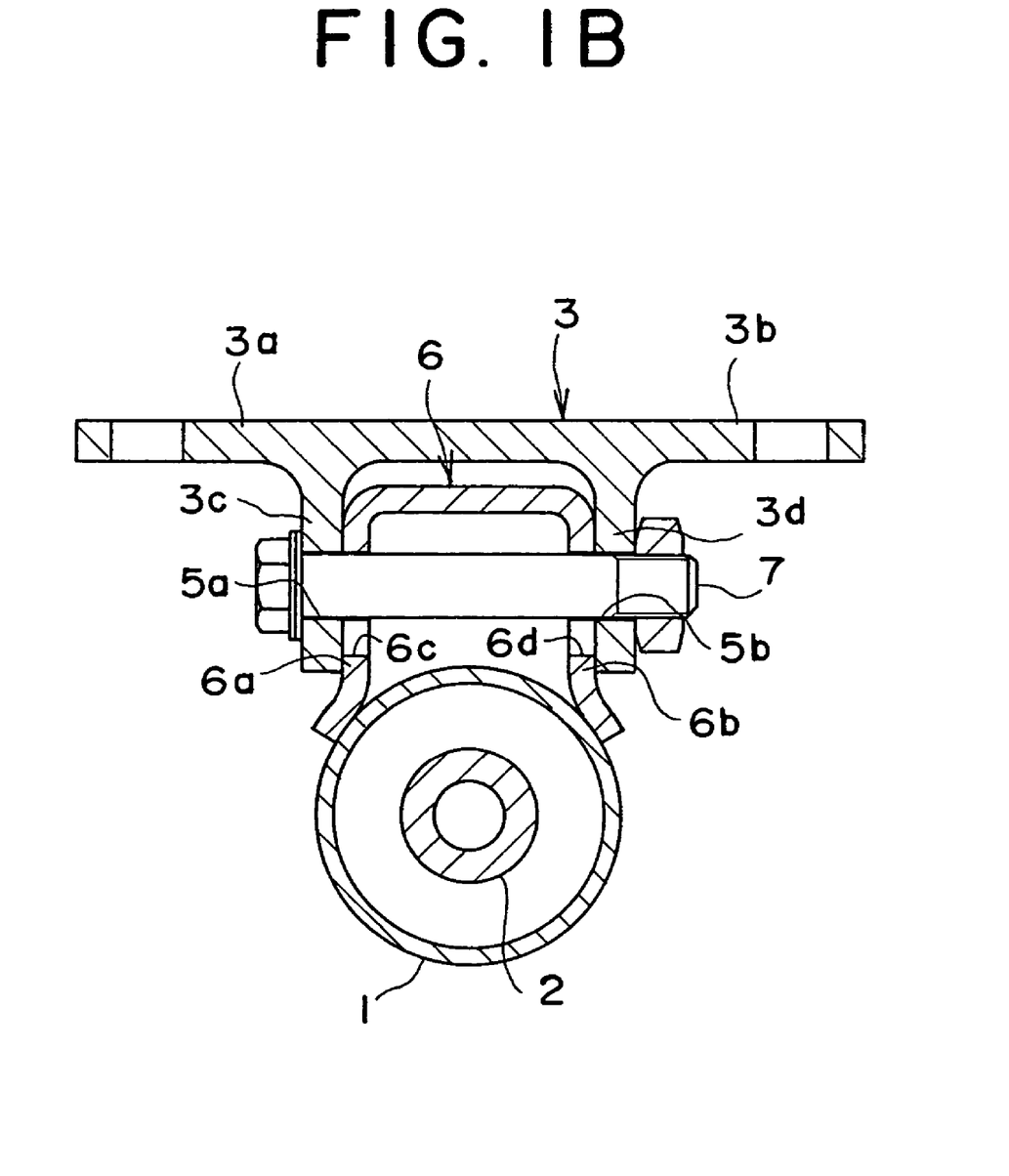
FIG. 1B is an enlarged sectional view taken along the arrowhead line 1B-1B in FIG. 1A.
Figure 2:
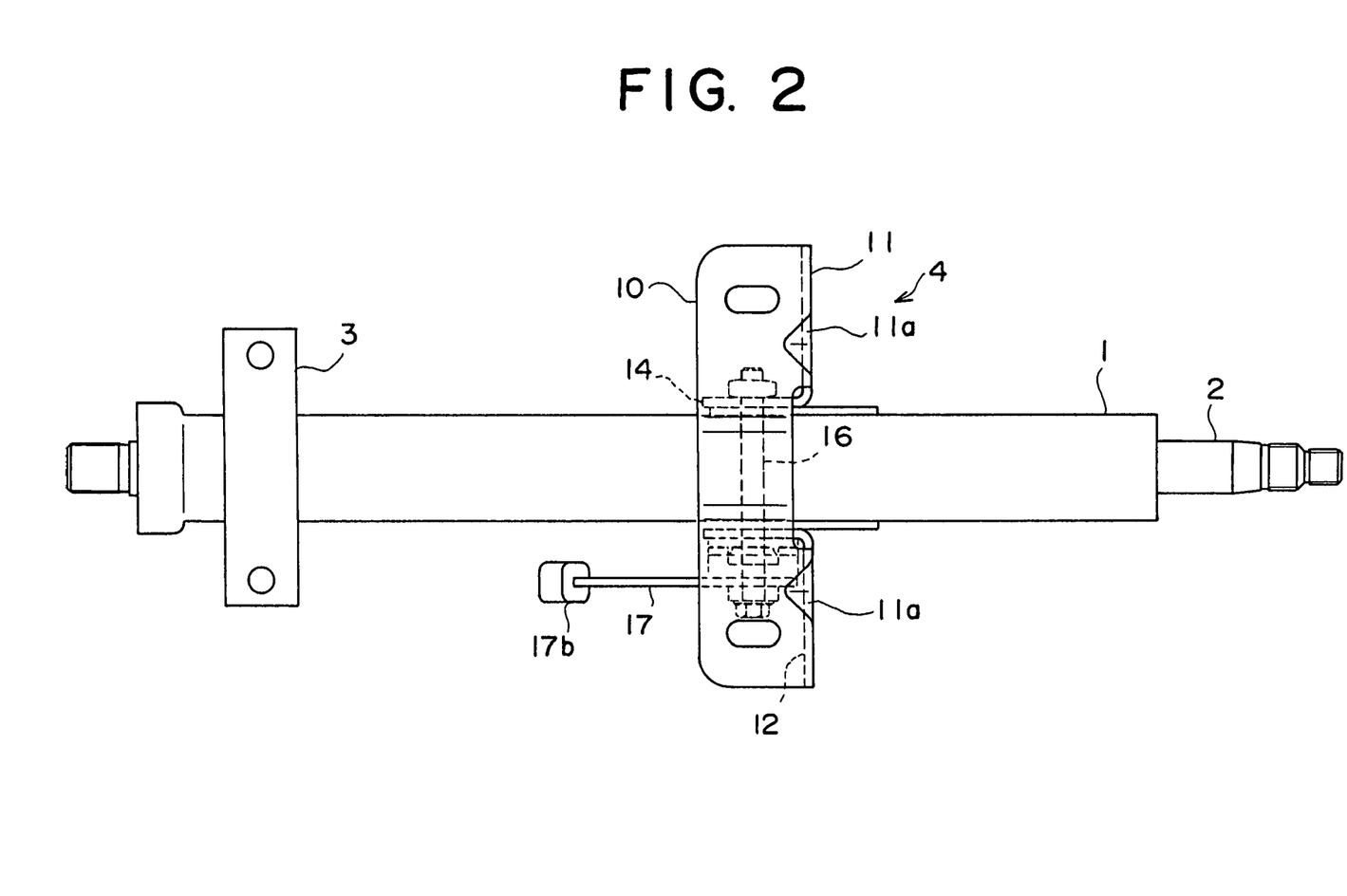
FIG. 2 is a plan view of the impact absorption type steering column apparatus for the automotive vehicle shown in FIG. 1A.
Figure 3:
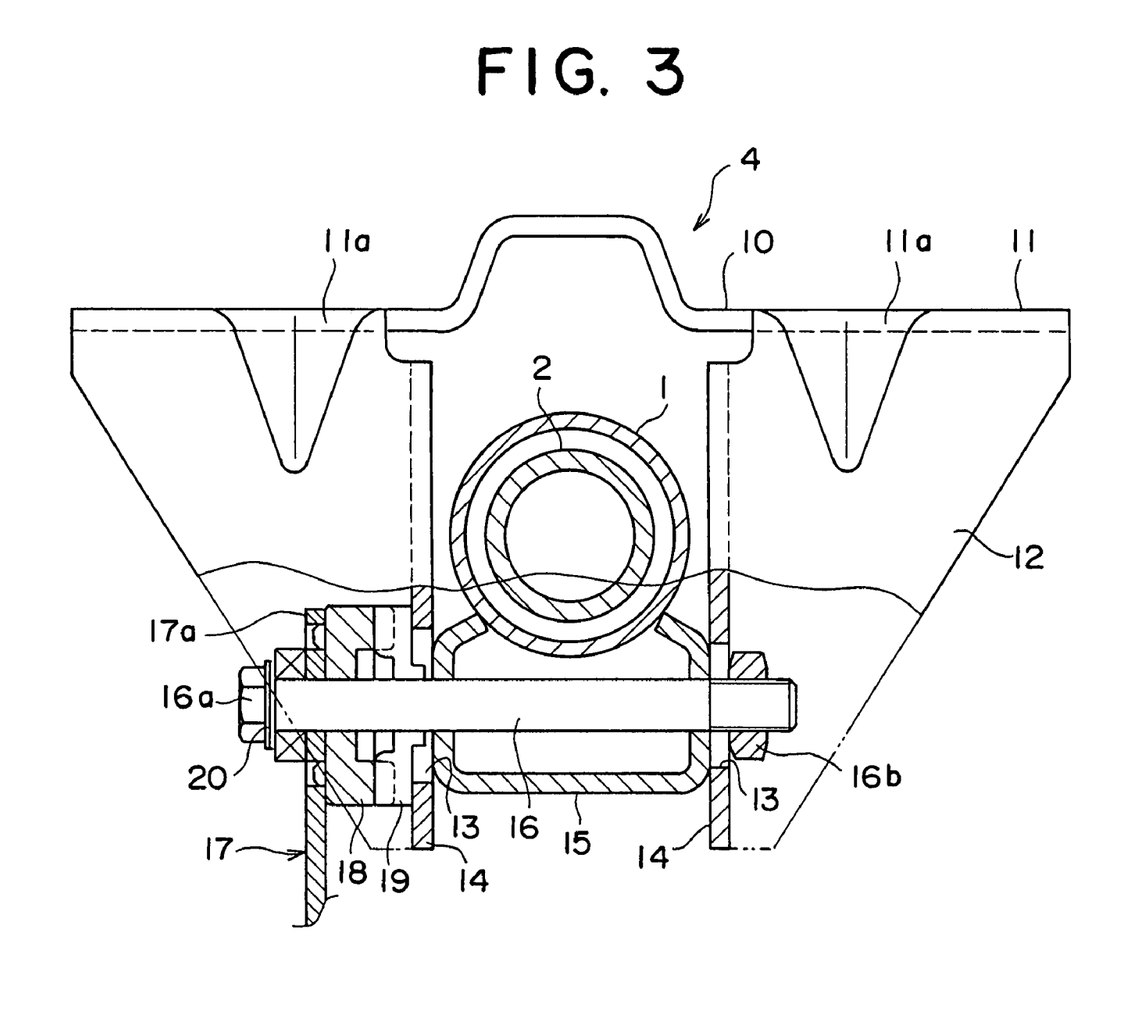
FIG. 3 is a sectional view taken along the line A-A in FIG. 1A.
Figure 4:
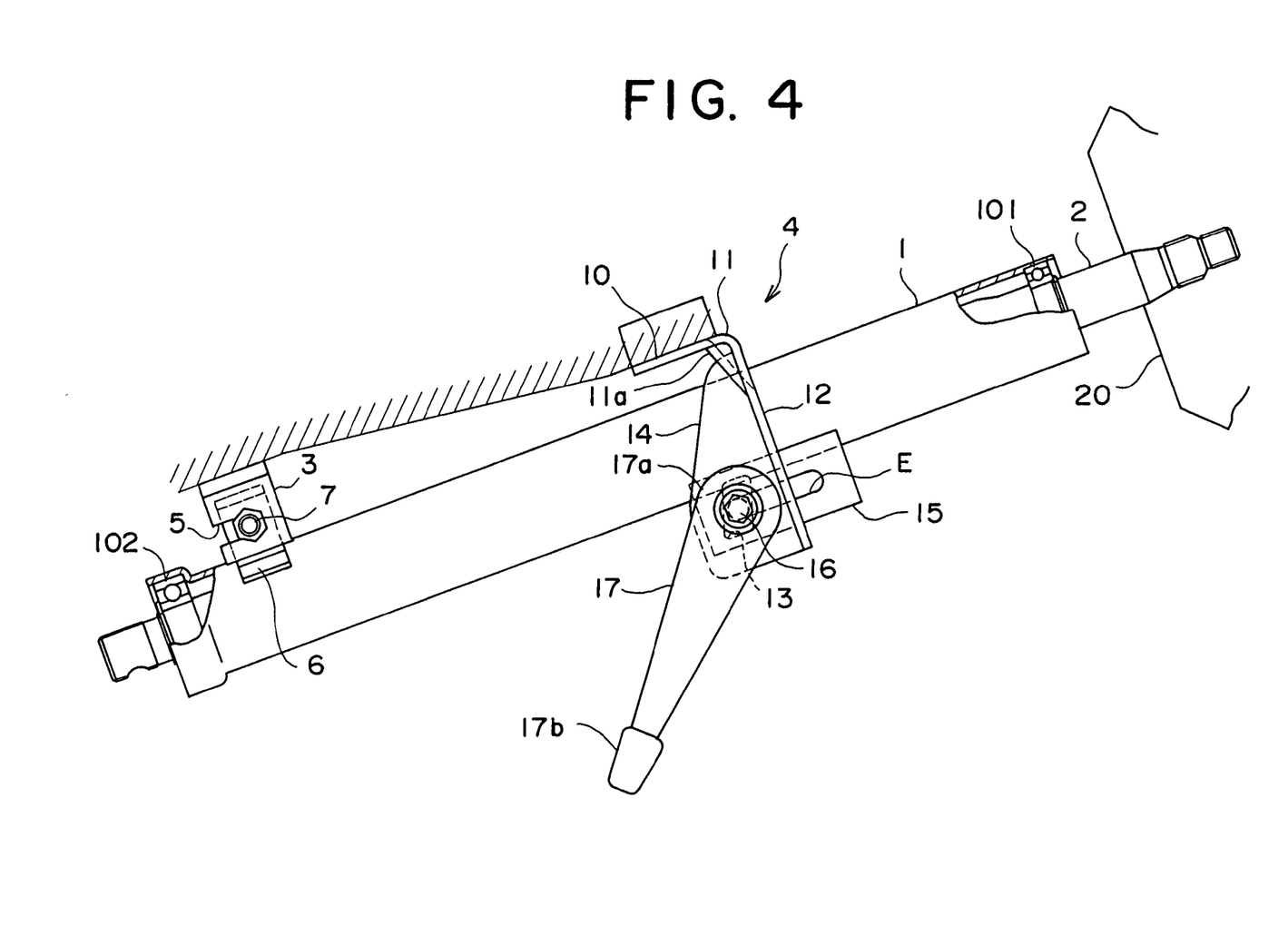
FIG. 4 is a side view showing a state where the impact absorption type steering column apparatus for the automotive vehicle in FIG. 1A is installed in an actual car.
Figure 5:
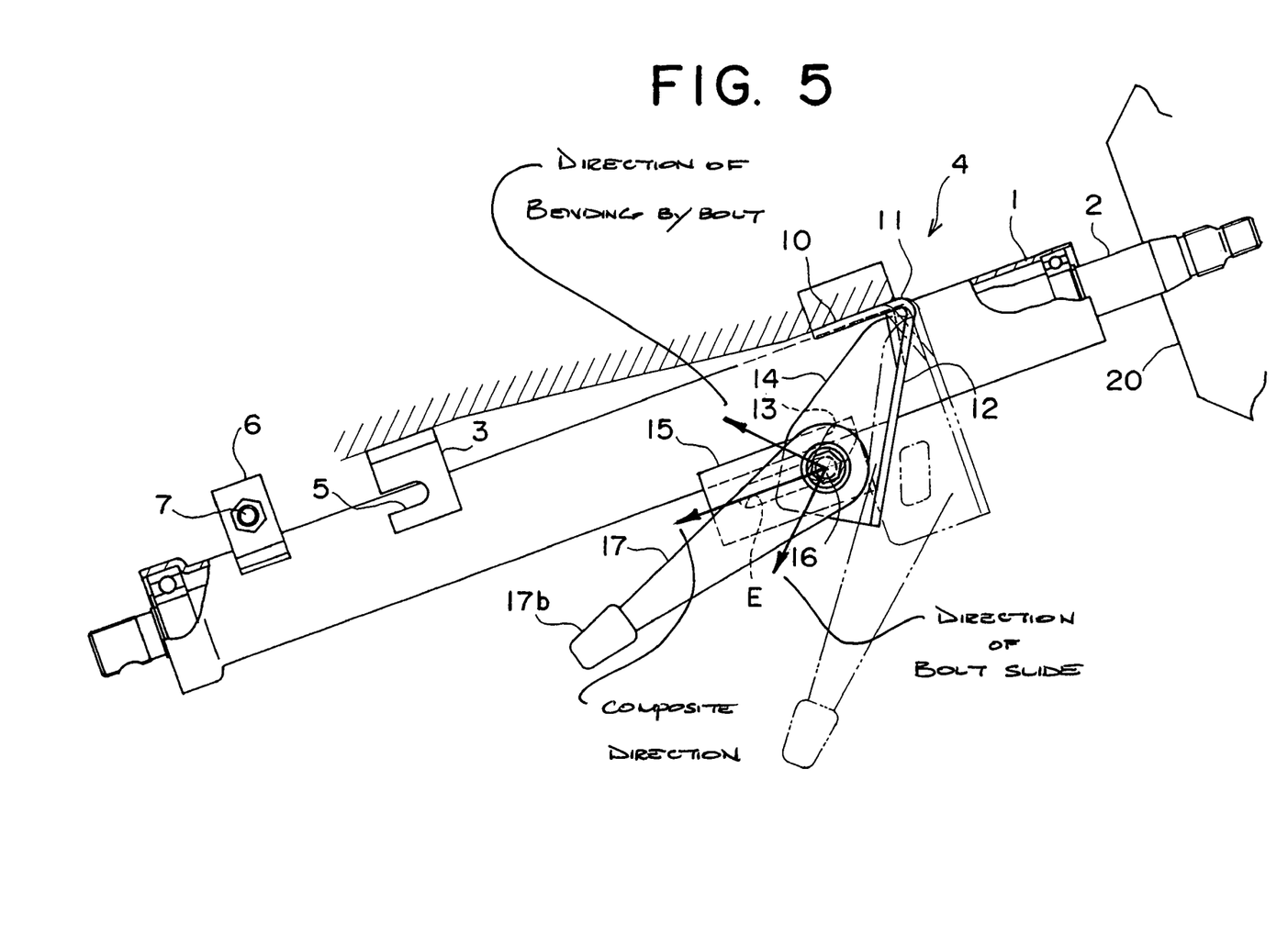
FIG. 5 is a side view showing an operation following a secondary collision in a state where the impact absorption type steering column apparatus for the automotive vehicle in FIG. 1A is installed in the actual car.

FIG. 1A is a side view of the impact absorption type steering column apparatus for the automotive vehicle in a first embodiment of the present invention. FIG. 1B is an enlarged sectional view taken along the line 1B-1B in FIG. 1A. FIG. 2 is a plan view of the impact absorption type steering column apparatus for the automotive vehicle shown in FIG. 1A. FIG. 3 is a sectional view taken along the line A-A in FIG. 1A. FIG. 4 is a side view showing a state where the impact absorption type steering column apparatus for the automotive vehicle is installed in an actual car. FIG. 5 is a side view showing an operation following a secondary collision in the state where the impact absorption type steering column apparatus for the automotive vehicle is installed in the actual car.

As shown in FIG. 1A, a steering shaft 2 is rotatably supported at both ends thereof through bearings 101, 102 within the steering column 1. This steering column 1 is secured to a car body at its lower end portion through a car body sided lower bracket 3 and at its intermediate portion through a car body sided upper bracket 4 (a bracket for a tilt adjustment) taking substantially an L-shape as viewed from a side. The car body sided lower bracket 3 and the car body sided upper bracket 4 are fixed to structural members (unillustrated) of the car body with bolts, etc.

As shown in FIGS. 1A and 1B, the car body sided lower bracket 3 is provided with a pair of car body securing portions 3a, 3b, and further with a pair of opposed right and left flat plate portions 3c, 3d extending substantially vertically from the pair of car body securing portions 3a, 3b.

A column sided lower bracket 6 of the steering column 1 is fixed by welding to a cylindrical outer peripheral surface of the steering column 1.

The column sided lower bracket 6 has opposed flat plate portions 6a, 6b facing the respective opposed flat plate portions 3c, 3d of the car body sided lower bracket 3. These opposed flat plate portions 6a, 6b are formed with round holes 6c, 6d.

The opposed flat plate portions 6a, 6b of the column sided lower bracket 6 are slidably pinched in between the opposed flat plate portions 3c and 3d of the car body sided lower bracket 3.

The opposed flat plate portions 3c, 3d of the car body sided lower bracket 3 are formed with cut-away portions 5a, 5b opened forwards of the automotive vehicle.

A tilt center bolt 7 inserted through the round holes 6c, 6d of the column sided lower bracket 6 of the steering column 1, engages with the cut-away portions 5a, 5b, thereby enabling the steering column 1 to move forwards of the automotive vehicle upon the secondary collision.

Note that the car body sided lower bracket may be formed with the round holes, while the column sided lower bracket may be formed with the cut-aways opened in the opposite direction as a substitutive example for the illustrated example given above, thereby configuring the separation structure against the secondary collision.

The car body sided upper bracket 4 taking substantially the L-shape is constructed integrally of a car body securing portion 10 secured to the car body with bolts, etc., vertical wall portions 12 bent substantially in an L-shape along bending portions 11 and extending downwards from a rear end of this car body securing portion 10, and column fastening fixing portions 14 erecting from the vertical wall portions 12 and extending sideways of the column 1 towards the front, the portions 14 having elongate holes 13 for a tilt adjustment.

On an internal side of the car body sided upper bracket (the tilt adjustment bracket) 4, a column sided upper bracket 15 (a distance bracket) fixed by welding, etc. to both sides of a lower portion of the steering column 1, is provided in a press-fittable manner, and a tilt position fastening bolt 16 is inserted through the tilt adjustment elongate holes 13 of the column fastening fixing portions 14 and through-holes E of the column sided upper bracket 15. The through-hole E is an elongate hole extending backwards substantially in parallel with an axis of the column. The through-hole E may be given a proper change in its width from midways in the lengthwise direction, whereby a collapse characteristic can be given a variation.

A contrivance is that with a swing of a fastening lever 17 attached to a proximal end portion of the tilt position fastening bolt 16, the car body sided upper bracket 4 presses and fixes the column sided upper bracket 15 so that the column apparatus can be fastened in a tilt position, or with a release of this pressing, the column apparatus can be released from the tilt position. The column apparatus, when released from the tilt position, rotates about the bolt 7 and thus becomes adjustable of the tilt position. Further, a handle member 17b of the fastening lever 17 is disposed more front side of the automotive vehicle than the proximal end portion 17a when in the tilt fastening operation.

Moreover, as shown in FIG. 3, a proximal end portion of the tilt position fastening bolt 16 is provided with a cam lock mechanism. This cam lock mechanism is provided with a first cam 18 rotating together with the fastening lever 17, and an non-rotatable second cam 19 engaging with the first cam 18 and thus locking. A protrusion of the second cam 19 engages with the elongate hole 13 of the column fastening fixing portion 14, thus becoming non-rotatable. A sliding bearing 20 is interposed between the fastening lever 17 and the bolt head 16a. The fastening to the tilt position may be attained by a screw-based mechanism as a substitute for the cam lock mechanism.

Further, as shown in FIGS. 2 and 3, reinforcing beads 11a are formed in the bent portions 11 of the car body sided upper bracket 4. A bending load caused upon the secondary collision, i.e., an energy absorption characteristic can be adjusted by changing a size and a shape of the reinforcing bead 11a.

As illustrated in FIG. 4, in the state where the impact absorption type steering column apparatus for the automotive vehicle in the first embodiment is installed in the actual car, the bent portion 11 and the vertical wall portion 12 are disposed, on the rear side of the automotive vehicle, at the car body securing portion 10 of the car body sided upper bracket 4, and the column fastening fixing portion 14 is disposed, on the front side of the automotive vehicle, at the vertical wall portion 12. With this arrangement, the tilt position fastening bolt 16 comes to be positioned downwards substantially in the vertical direction of the bent portion 11.

Further, according to the first embodiment, as shown in FIGS. 1A and 4, in order to increase a quantity of the collapse stroke of the steering column when the secondary collision happens, the column sided upper bracket 15 extends comparatively long towards the rear side of the automotive vehicle, and further the through-hole of the column sided upper bracket 15 is formed in an extra stroke area E as an elongate hole extending on the rear side of the automotive vehicle from the position of the tilt position fastening bolt 16.

With this formation, as will be explained later on, even after the end of the collapse stroke of the steering column due to the flexural deformation of the car body sided upper bracket 4, the column sided upper bracket 15 moves, with respect to the tilt position fastening bolt 16 of the car body sided upper bracket 4, together with the steering column 1 along the extra stroke area E as the elongate hole from a front side end down to a rear side end of this area E while engaging therewith towards the front of the automotive vehicle, and thus can make the collapse stroke. The elongate hole E for the extra stroke is not limited to being parallel with the steering shaft, and a collapse trajectory can be properly set by making the elongate hole E slant to the steering shaft, and so on.

Owing to the configuration described above, upon the secondary collision, as shown in FIG. 5, when a load of the secondary collision acts on the steering wheel 20 from the rear to the front of the automotive vehicle, the steering column 1 will move together with the column sided upper bracket 15 and the tilt position fastening bolt 16 towards the front of the automotive vehicle.

Note that the tilt position fastening bolt 16, as shown in FIG. 5, moves down to the lowermost position of the tilt adjustment groove 13.

On this occasion, an impact load on the driver acts substantially horizontally from the rear to the front of the automotive vehicle. On the other hand, the tilt position fastening bolt 16, which is disposed downwards substantially in the vertical direction, starts moving substantially in the horizontal direction by making the bent portion 11*a* to be a fulcrum and subsequently rotates about the bent portion 11 (fulcrum), however, the column sided lower bracket 6 separates from the car body sided lower bracket 3 downwardly of the steering column 2.

With this operation, as shown in FIG. 5, in the impact absorption type steering column apparatus for the automotive vehicle in the first embodiment, the vertical wall portion 12 and the column fastening and fixing portion 14 of the car body sided upper bracket 4 becomes collapsed while making their flexural deformations so as to rotate about the bent portion 11 (the fulcrum), thereby absorbing an secondary impact energy.

Thus, according to the first embodiment, the bent portion 11 and the vertical wall portion 12 are disposed, on the rear side of the automotive vehicle, at the car body securing portion 10, and the column fastening and fixing portion 14 is disposed, on the front side of the automotive vehicle, at the vertical wall portion 12. With this layout, when the secondary collision happens, the vertical wall portion 12 and the column fastening fixing portion 14 of the car body sided upper bracket 4 start moving in a direction of rotating about the bent portion 11 as the fulcrum, however, this direction is substantially the horizontal direction and is substantially coincident with an input (substantially horizontal) direction of the impact load exerted from the driver. Accordingly, the start of the movement of the car body sided upper bracket 4 can be stabilized when the secondary collision happens.

Further, according to the first embodiment, the handle member 17*b* of the fastening lever 17 is disposed more front side of the automotive vehicle than the proximal end portion 17*a* thereof, and besides, as shown in FIG. 5, the fastening lever 17, following up the collapse of the car body sided upper bracket 4, moves towards the front of the automotive vehicle while rotating, and hence a safety of the car driver from a knee-hit against the fastening lever 17, can be further enhanced.

Note that the car body sided upper bracket 4 has the tilt adjustment elongate hole 13, and therefore, after the car body sided upper bracket 4 has been bent, the tilt adjustment elongate hole 13 becomes substantially parallel with a collapsing direction and the tilt adjustment elongate hole 13 also can be used for a part of the collapse stroke, whereby the collapse stroke can be further increased.

Next, when the secondary collision happens, as illustrated in FIG. 5, even after the end of the collapse stroke due to the flexural deformation of the car body sided upper bracket 4, the column sided upper bracket 15 moves, with respect to the tilt position fastening bolt 16 of the car body sided upper bracket 4, together with the steering column 1 along the extra stroke area E as the elongate hole from the front side end down to the rear side end of this area E while engaging therewith towards the front of the automotive vehicle, and thus can make the collapse stroke.

Namely, it is possible to ensure the collapse stroke quantity throughout the extra stroke area E as the elongate hole of the column sided upper bracket 15 as well as the collapse stroke quantity due to the flexural deformation of the car body sided upper bracket 4. Accordingly, as required depending on the type of the automotive vehicle, its delivery destination and so forth, the collapse stroke quantity in the steering column 1 can be further augmented.

When at the collapse stroke throughout the extra stroke area E as the elongate hole of the column sided upper bracket 15, the impact energy can be absorbed also by a friction between the car body sided upper bracket 4 and the column sided upper bracket 15.

It is to be noted that, depending on a balance between a set value of the bending load on the bent portion 11 of the car body sided upper bracket 4 and a set value of a fastening clamp force in the tilt position, there are a case in which the collapse stroke due to the flexural deformation of the car body sided upper bracket 4 occurs, as described above, earlier than the collapse stroke throughout the extra stroke area E as the elongate hole of the column sided upper bracket 15, and a case in which the collapse stroke throughout the extra stroke area E as the elongate hole of the column sided upper bracket 15 occurs earlier than the collapse stroke due to the flexural deformation of the car body sided upper bracket 4.

Figure 6:
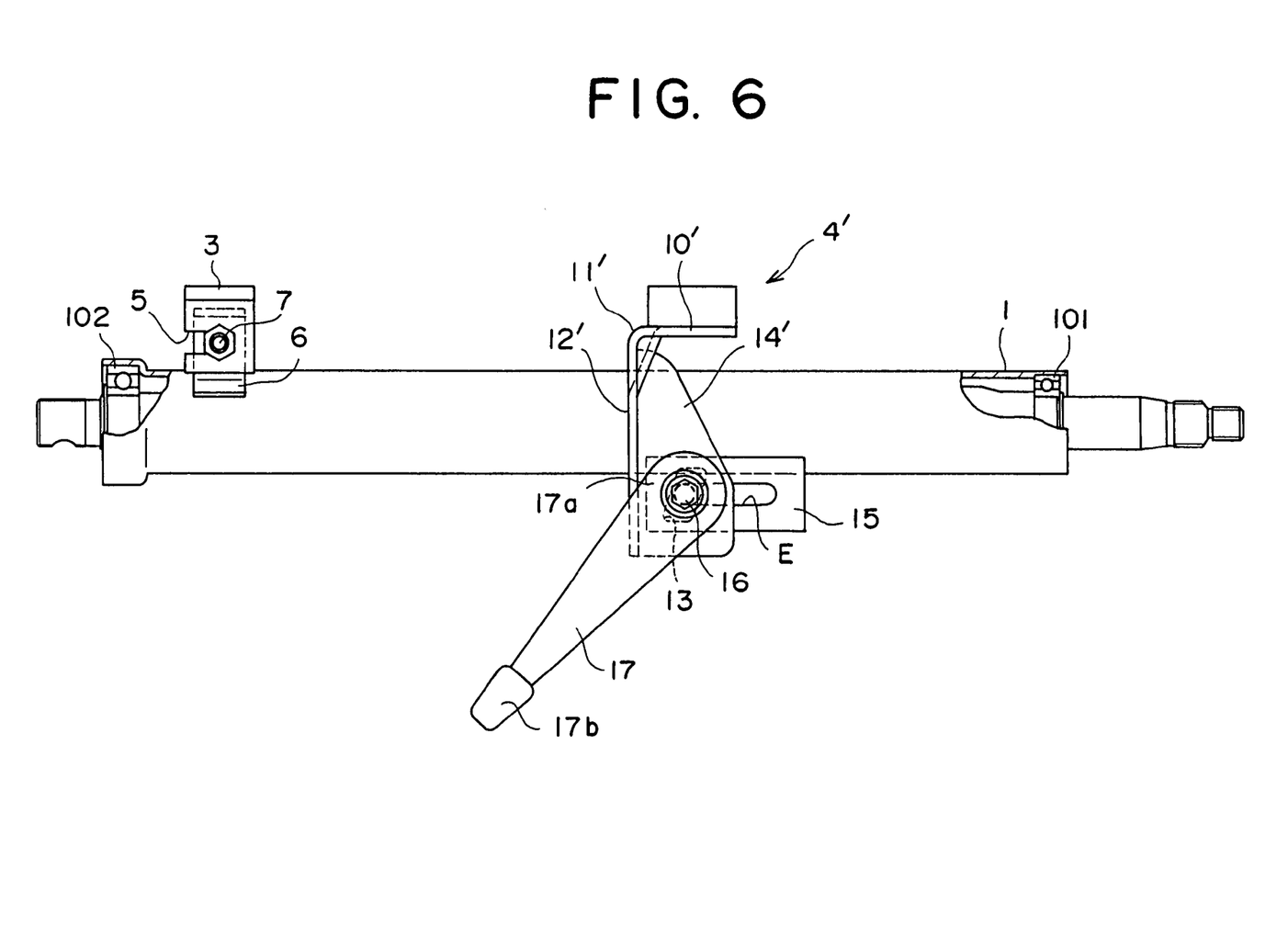
FIG. 6 is a side view showing a modified example of the impact absorption type steering column apparatus for the automotive vehicle in the first embodiment of the present invention.

FIG. 6 shows a modified example of the first embodiment discussed above. In a car body sided upper bracket (a tilt bracket) 4' shown in FIG. 6, a bent portion 11' and a vertical wall portion 12' are integrally formed at a front side end of a car body securing member 10', and a column fastening fixing portion 14' is disposed, on the rear side of the automotive vehicle, at the vertical wall portion 12'. Accordingly, in this modified example, the vertical wall portion 12' of the car body sided upper bracket exists more front side of the automotive vehicle than the vertical wall portion 12 in the above described first embodiment. In this modified example as well, the through-hole, for the fastening bolt 16, of the column sided upper bracket 15 extends towards the rear of the automotive vehicle. Other members have the same constructions as those in the first embodiment illustrated in FIG. 1A, and therefore the same members are shown by marking them with the like symbols, of which the explanations are omitted.

According to this modified example, the vertical wall portion 12' is provided more front side of the automotive vehicle than the vertical wall portion 12 in the first embodiment, and hence it is feasible to take a larger range of the swing of the steering column in the event of the secondary collision and therefore to take a larger collapse stroke.

Second Embodiment

Figure 7:
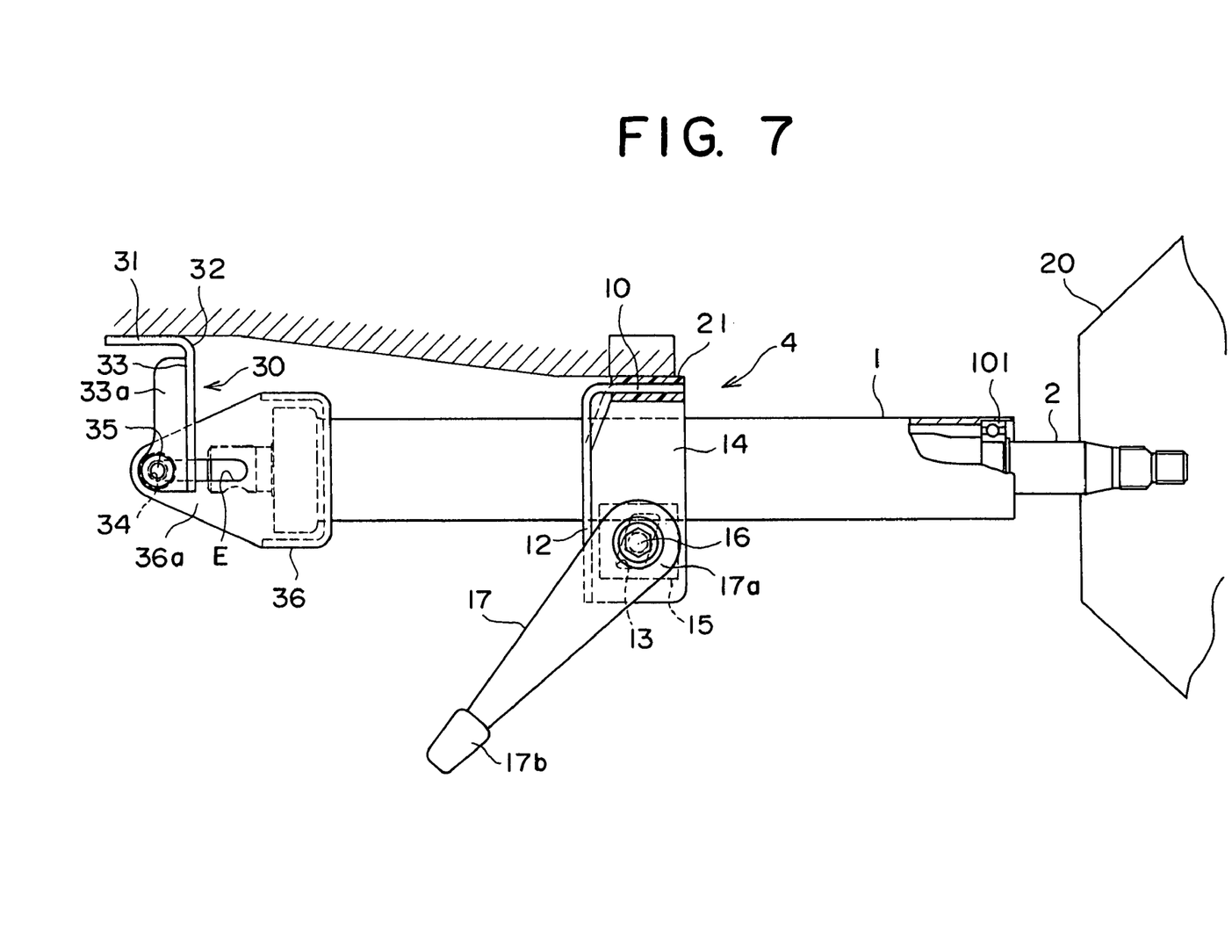
FIG. 7 is a side view of the impact absorption type steering column apparatus for the automotive vehicle in a second embodiment of the present invention.
Figure 8:
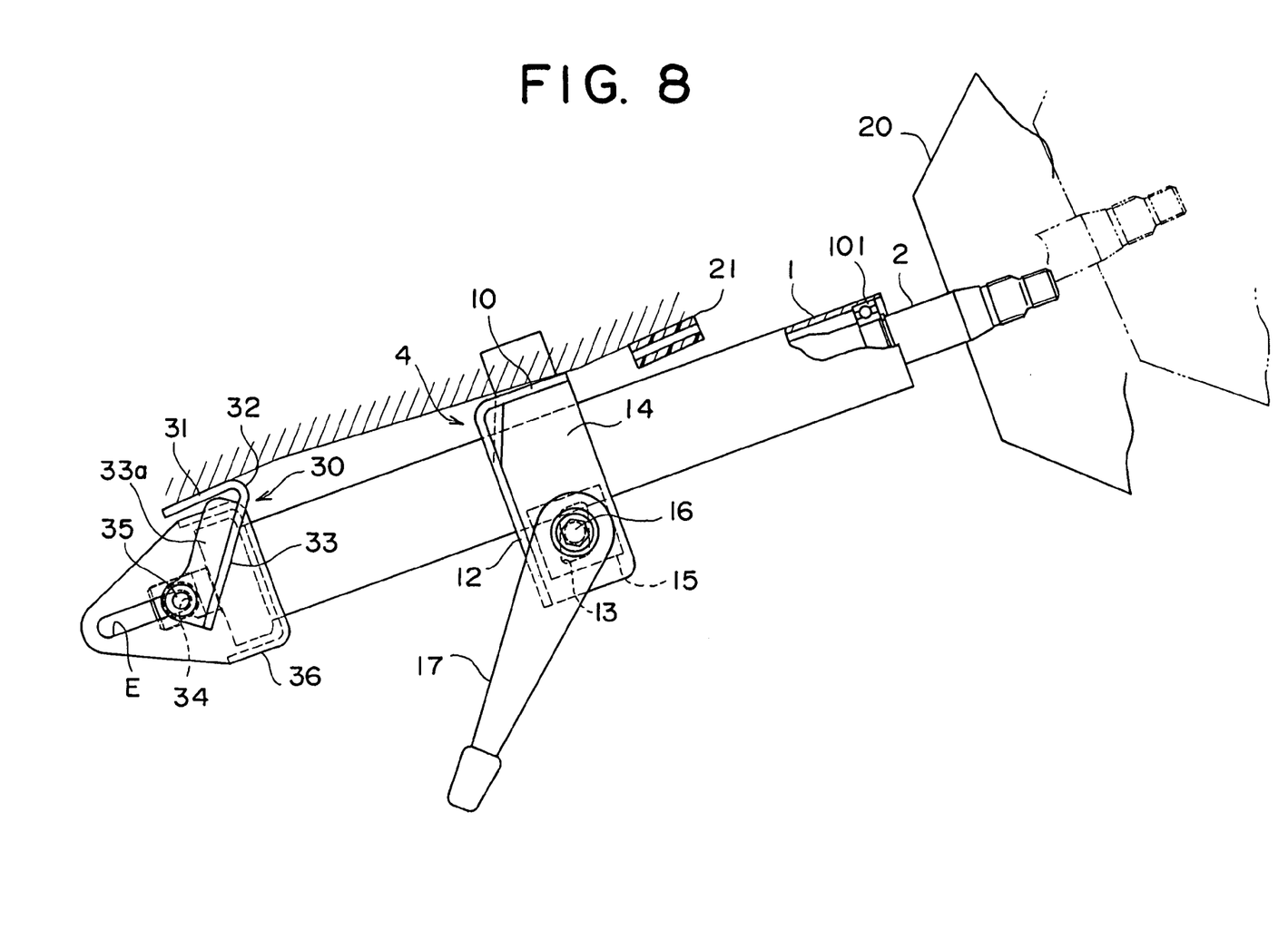
FIG. 8 is a side view showing an operation following the secondary collision in the state where the impact absorption type steering column apparatus for the automotive vehicle in FIG. 7 is installed in the actual car.

FIG. 7 is a side view of the impact absorption type steering column apparatus in a second embodiment of the present invention. FIG. 8 is a side view showing an operation following the secondary collision in the state where the impact absorption type steering column apparatus for the automotive vehicle is installed in the actual car.

In the second embodiment, as shown in FIG. 7, a flange of the car body securing portion 10 of the car body sided upper bracket 4 (the tilt adjustment bracket) is provided with a separation capsule 21, composed of a resin, for separating the car body sided upper bracket 4 from the car body upon the secondary collision. Owing to this capsule 21, upon the secondary collision, the car body sided upper bracket 4 separates from the car body and moves forwards without making the flexural deformation as in the first embodiment discussed above.

The car body sided upper bracket 4 taking substantially the L-shape is constructed integrally of a car body securing portion 10 extending almost horizontally and secured to the car body with a bolt, etc., vertical wall portions 12 bent substantially in the L-shape along bent portions 11 and extending downwards from a front side end of this car body securing portion 10, and column fastening fixing portions 14 extending sideways of the column 1 substantially at a right-angled to the car body securing portion 10 and to the vertical wall portion 12 and extending sideways of the column 1, the portions 14 having the elongate holes 13 for the tilt adjustment. The vertical wall portions may not be provided.

On the internal side of the car body sided upper bracket (the tilt adjustment bracket) 4, the column sided upper bracket 15 (the distance bracket) fixed by welding, etc. to both sides of the lower portion of the steering column 1, is press-fitted, and the tilt position fastening bolt 16 is inserted through the tilt adjustment elongate holes 13 of the column fastening fixing portions 14 and round through-holes of the column sided upper bracket 15.

A contrivance is that with the swing of the fastening lever 17 attached to the proximal end portion of the tilt position fastening bolt 16, the car body sided upper bracket 4 presses and fixes the column sided upper bracket 15, so that the column apparatus can be fastened in a tilt adjusted position or with a release of this pressing, the column apparatus can be released from the tilt adjusted position. The column apparatus, when released from the tilt adjusted position, can rotate about the bolt 7 and thus becomes adjustable of the tilt adjusting position. Further, the handle portion 17b of the fastening lever 17 is disposed more front side of the automotive vehicle than the proximal end portion 17a thereof when in the tilt fastening operation.

Moreover, as in the case shown in FIG. 3, the proximal end portion of the tilt position fastening bolt 16 is provided with a cam lock mechanism. This cam lock mechanism is the same as in FIG. 3, and hence its explanation is omitted.

A car body sided lower bracket 30 is of such a type as to absorb the impact energy by making the flexural deformation upon the secondary collision. The car body sided lower bracket 30 is integrally constructed of a car body securing portion 31 secured to the car body with a bolt, etc., a vertical wall portions 33 bent substantially in the L-shape along a bent portion 32 from a rear side end of the car body securing portion 31, and side plate portions 33a bent forwards at a right-angled from the vertical wall portions 33 and extending on both sides of the column. The energy absorption may be adjusted by providing ribs properly between the car body securing portion 31 and the vertical wall portion 33.

The car body sided lower bracket 30 is formed with support holes 34. A lower bracket 36 is provided at a lower end of the steering column 1 integrally with or separately from the column 1. The lower bracket 36 integrally has side plates 36a internally abutting on the side plate portions 33a of the car body sided lower bracket 30 on both sides of the column. Each of these side plates 36a is formed with a through-hole corresponding to the support hole 34 of the car body sided lower bracket 30. A hinge pin 35 that defines a center of a tilt motion is inserted through between the support hole 34 and the through-hole of the column sided lower bracket 36 of the steering column 1.

Further, according to the second embodiment, in order to increase a quantity of the collapse stroke of the steering column when the secondary collision happens, the through-holes formed in the side plates 36a of the column sided lower bracket 36 are configured in the extra stroke area E as elongate holes extending on the rear side of the automotive vehicle from a position of the tilt adjusting hinge pin 35. The extra stroke area E may be set parallel with or slant to the steering shaft. Moreover, the energy may also be absorbed in the extra stroke area E, and the extra stroke area E may be given a proper change in its width from midways in the lengthwise direction, whereby a collapse characteristic can be given a variation.

With the configuration described above, when the secondary collision happens, as illustrated in FIG. 8, a load of the secondary collision acts on the steering wheel 20 from the rear to the front of the automotive vehicle, at which time the steering column 1 will move together with the car body sided upper bracket 4 and the column sided upper bracket 15 towards the front of the automotive vehicle by dint of action of the separation capsule 21.

On this occasion, the impact load on the driver acts substantially in the horizontal direction from the rear to the front of the automotive vehicle. On the other hand, the tilt hinge pin 35 is disposed downwards substantially in the vertical direction of the bent portion 32. The tilt hinge pin 35 starts moving substantially in the horizontal direction with the bent portion 32 serving as a fulcrum and subsequently rotates about the bent portion 32 (the fulcrum).

With this operation, the vertical wall portions 33 becomes collapsed while making its flexural deformation so as to rotate about the bent portion 32 (the fulcrum), thereby absorbing the energy of the secondary collision.

Next, when the secondary collision occurs, as shown in FIG. 8, even after the end of the collapse stroke of the steering column due to the flexural deformation of the car body sided lower bracket 30, the column sided lower bracket 36 moves, with respect to the hinge pin 35 of the car body sided lower bracket 30, together with the steering column 1 along the extra stroke area E as the elongate hole from a front side end down to a rear side end of this area E while engaging therewith towards the front of the automotive vehicle, and thus can make the collapse stroke.

Namely, it is feasible to ensure the collapse stroke quantity of the steering column throughout the extra stroke area E as the elongate hole of the column sided lower bracket 36, in addition to the collapse stroke quantity of the steering column due to the flexural deformation of the car body sided lower bracket 30. Accordingly, as required depending on the type of the automotive vehicle, its delivery destination and so forth, the collapse stroke quantity in the steering column 1 can be further augmented.

When at the collapse stroke of the steering column throughout the extra stroke area E as the elongate holes of the column sided lower bracket 36, the impact energy can be absorbed also by a friction caused by a caulking force of the tilt hinge pin 35.

Note that, depending on a balance between a set value of the flexural load on the bent portion 32 of the car body sided lower bracket 30 and a set value of the caulking force of the tilt hinge pin 35, there are a case in which the collapse stroke of the steering column due to the flexural deformation of the car body sided lower bracket 30 occurs, as described above, earlier than the collapse stroke of the steering column throughout the extra stroke area E as the elongate hole of the column sided lower bracket 36, and a case in which the collapse stroke of the steering column throughout the extra stroke area E as the elongate hole of the column sided lower bracket 36 occurs earlier than the collapse stroke of the steering column due to the flexural deformation of the car body sided lower bracket 30.

In the second embodiment, the car body sided upper bracket 4 may be set unseparable from the car body 10, and instead the distance bracket may be set separable when the secondary collision occurs.

Note that the present invention is not limited to the embodiments discussed above and can be modified in a variety of forms. The column sided upper bracket 15 (the distance bracket) is provided separately from the steering column 1 in the embodiment discussed above and may also be formed integrally with the steering column 1 by hydrostatic bulge working, etc.

As explained above, according to the present invention, when the secondary collision happens, its impact energy is absorbed in a way that causes the flexural deformation of the car body sided bracket while moving the steering column towards the front of the automotive vehicle, and, on this occasion, the through-hole of the column sided bracket being formed as the elongate hole extending towards the rear side of the automotive vehicle from the bolt position, even after the end of the collapse stroke of the steering column due to the flexural deformation of the car body sided bracket, the column sided bracket moves, with respect to the bolt of the car body sided bracket, together with the steering column along this elongate hole towards the front of the automotive vehicle while engaging therewith from the front side end to the rear side end, and thus make the collapse stroke.

Namely, it is possible to ensure the collapse stroke quantity of the steering column throughout the elongate hole of the column sided bracket as well as the collapse stroke quantity of the steering column due to the flexural deformation of the car body sided bracket. Accordingly, as required depending on the type of the automotive vehicle, its delivery destination and so forth, the collapse stroke quantity in the steering column can be further augmented.

Note that the collapse stroke of the steering column throughout the elongate holes of the column sided bracket might occur earlier than the collapse stroke of the steering column due to the flexural deformation of the car body sided bracket.

What is claimed is:

1. An impact absorption type steering column apparatus for an automotive vehicle in which column sided upper and lower brackets provided fixedly to or integrally with a steering column are respectively press-fitted to vehicle body sided upper and lower brackets secured to a vehicle body, said steering column is supported by inserting a fastening bolt through through-holes formed in said column sided upper bracket and said vehicle body sided upper bracket and by inserting a pivoting bolt through through-holes formed in said column sided lower bracket and said vehicle body sided lower bracket as a center of rotation for tilt movement of the steering column, and, when a secondary collision happens, said vehicle body sided upper bracket is arranged to absorb an impact energy thereof by deforming while moving said steering column towards the front of the automotive vehicle,
  wherein said vehicle body sided upper bracket is composed integrally of a vehicle body securing portion to be secured to a strength member of the vehicle body, a vertical wall portion extending downwards from the vehicle body securing portion through a bending portion to form a substantially L-shaped bracket, and column fastening fixing portions projecting from the vertical wall portion and extending along the column toward the front of the vehicle and having said through-hole as an elongate hole for inserting said fastening bolt for tilt adjustment,
  wherein said through-hole of said column sided upper bracket is formed as an elongate hole extending substantially in parallel with an axis of the steering column to the rear side of the automotive vehicle from a position of said fastening bolt, and
  wherein, upon secondary collision, said column sided lower bracket separates from said vehicle body sided lower bracket.

2. An impact absorption type steering column apparatus for an automotive vehicle according to claim 1, wherein the arrangement is such that, upon secondary collision, after said deformation of the vehicle body sided upper bracket, a collapse stroke occurs as a result of relative movement of the column sided bracket with respect to the vehicle body sided bracket and sliding movement of said bolt along said elongate hole of the column sided bracket.

3. An impact absorption type steering column apparatus for an automotive vehicle according to claim 1, wherein the arrangement is such that, upon secondary collision, before said deformation of the vehicle body sided upper bracket, a collapse stroke occurs as a result of relative movement of the column sided bracket with respect to the vehicle body sided bracket and sliding movement of said bolt along said elongate hole of the column sided bracket.

4. An impact absorption type steering column apparatus for an automotive vehicle according to claim 1, wherein in response to the secondary collision, a collapse stroke occurs as a result of relative movement of the column sided bracket with respect to the vehicle body sided bracket and sliding movement of said bolt along said elongate hole of the column sided bracket, thereby absorbing additional impact energy of the secondary collision.

5. An impact absorption type steering column apparatus for a vehicle in which a column sided upper bracket provided fixedly to or integrally with a steering column is press-fitted to a vehicle body sided upper bracket secured to a vehicle body, said steering column is supported by a bolt inserted through through-holes formed in said column sided and vehicle body sided upper brackets, and, when a secondary collision happens, an impact energy thereof is absorbed in a way that causes deformation of said vehicle body sided upper bracket while said steering column moves towards the front of the vehicle,
  wherein said through-hole of said column sided upper bracket is formed as an elongate hole extending substantially in parallel with an axis of the steering column toward the rear of the vehicle from a position of said bolt, said through-hole of said vehicle body sided upper bracket is an elongate hole for a tilt adjustment, and said bolt is a tilt position fastening bolt, wherein said vehicle body sided upper bracket is composed integrally of a vehicle body securing portion, a vertical wall portion extending downwards from the vehicle body securing portion through a bending portion to form a substantially L-shaped bracket, and column fixing portions extending from the vertical wall portion substantially in parallel with an axis of the steering column toward the front of the vehicle, and wherein said vertical wall portion and said column fixing portions are adapted to rotate about said bending portion upon secondary collision, thereby bringing the vehicle body sided upper bracket elongate hole toward alignment with a collapsing direction of the steering column.

6. An impact absorption type steering column apparatus for a vehicle according to claim 5, wherein the arrangement is such that, upon secondary collision, after said deformation of the vehicle body sided upper bracket, a collapse stroke occurs as a result of relative movement of the column sided bracket with respect to the vehicle body sided bracket and sliding movement of said bolt along said elongate hole of the column sided bracket.

7. An impact absorption type steering column apparatus for a vehicle according to claim 5, wherein the arrangement is such that, upon secondary collision, before said deformation of the vehicle body sided upper bracket, a collapse stroke occurs as a result of relative movement of the column sided bracket with respect to the vehicle body sided bracket and sliding movement of said bolt along said elongate hole of the column sided bracket.

8. An impact absorption type steering column apparatus for a vehicle according to claim 5, wherein in response to the secondary collision, a collapse stroke occurs as a result of relative movement of the column sided bracket with respect to the vehicle body sided bracket and sliding movement of said bolt along said elongate hole of the column sided bracket, thereby absorbing additional impact energy of the secondary collision.

* * * * *